United States Patent [19]

Wells

[11] 4,383,413
[45] May 17, 1983

[54] WAVE ENERGY APPARATUS

[76] Inventor: Alan A. Wells, Grove House, 15 Bridge Rd., Mepal, Cambridgeshire, England, CB6 ZAR

[21] Appl. No.: 276,340
[22] PCT Filed: Oct. 16, 1980
[86] PCT No.: PCT/GB80/00168
§ 371 Date: Jun. 15, 1981
§ 102(e) Date: Jun. 15, 1981
[87] PCT Pub. No.: WO81/01174
PCT Pub. Date: Apr. 30, 1981

[30] Foreign Application Priority Data

Oct. 17, 1979 [GB] United Kingdom .................. 7936005

[51] Int. Cl.³ ............................................. F03B 13/12
[52] U.S. Cl. ....................................... 60/497; 60/499; 60/501; 60/398
[58] Field of Search ................ 60/398, 495, 497, 499, 60/501; 417/100; 290/53, 54

[56] References Cited

U.S. PATENT DOCUMENTS

| | | | |
|---|---|---|---|
| 3,064,137 | 11/1962 | Corbett, Jr. et al. | 290/53 |
| 3,925,986 | 12/1975 | Barwick | 60/398 |
| 4,098,081 | 7/1978 | Woodman | 60/398 |
| 4,221,538 | 9/1980 | Wells | 415/2 |
| 4,271,668 | 6/1981 | McCormick | 60/398 |
| 4,286,347 | 9/1981 | Modisette | 60/398 |

FOREIGN PATENT DOCUMENTS

| | | |
|---|---|---|
| 2849325 | 5/1980 | Fed. Rep. of Germany . |
| 2370875 | 11/1977 | France . |
| 2401329 | 12/1978 | France . |
| 1014196 | 11/1961 | United Kingdom . |
| 1492427 | 11/1977 | United Kingdom . |
| 1574379 | 9/1980 | United Kingdom . |

Primary Examiner—Allen M. Ostrager
Attorney, Agent, or Firm—Bacon & Thomas

[57] ABSTRACT

Wave energy apparatus comprises a hollow buoy (2) for floating in water. The buoy has a turbine (5) which rotates in response to air flow into and out of the buoy (2) through a nozzle (4). The turbine (5) is designed to rotate in the same direction regardless of the axial direction of air flow. The air flow is caused by the change of level of water (W) within the buoy in response to wave motion.

To enable rocking motion to be accommodated as well as vertical motion, the interior of the buoy is divided into a plurality of conduits (9), by means of partitions (6), the conduits directing air to different portions of the turbine (5). The conduits (9) preferably have lateral openings (10) and may be defined in part by upwardly inclined portions (11) of an inertial body (8).

In an alternative embodiment the buoy has a closed bottom and liquid in the buoy is acted on by a centrally disposed air spring.

13 Claims, 8 Drawing Figures

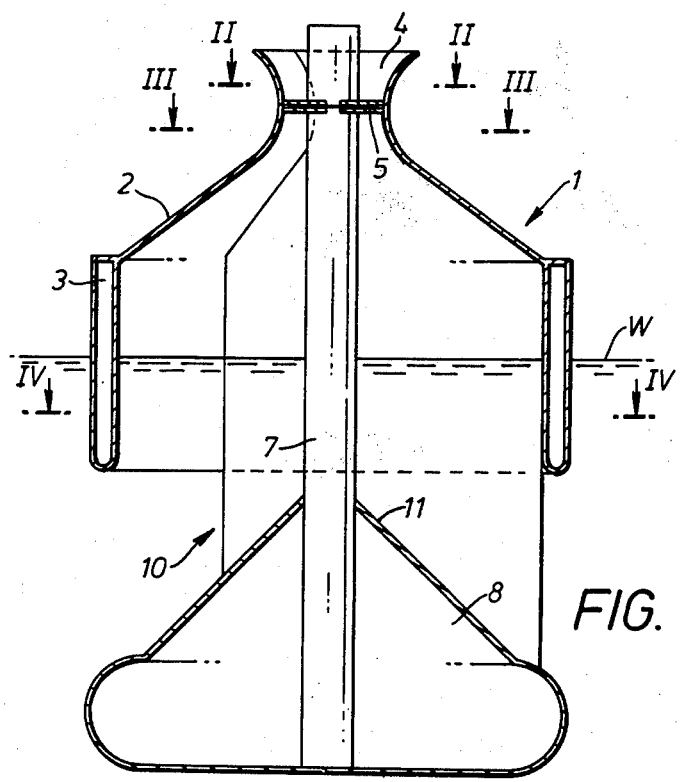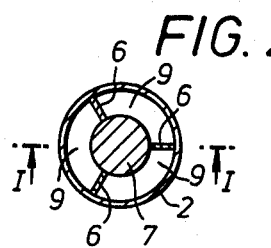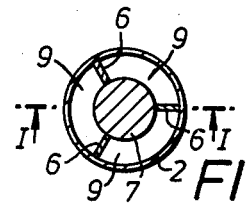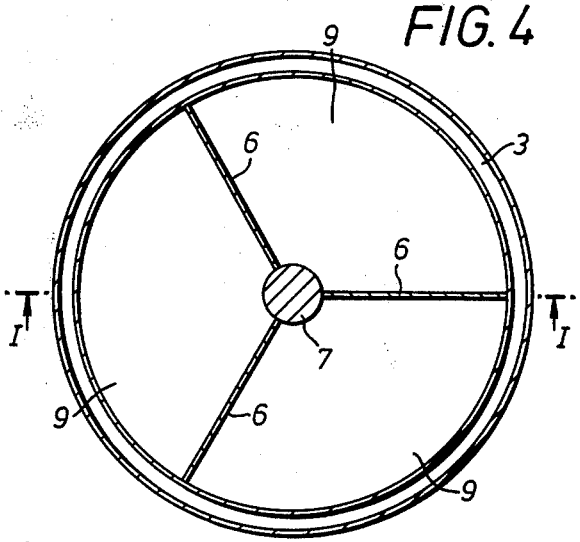
FIG. 1
FIG. 2
FIG. 3
FIG. 4

WAVE ENERGY APPARATUS

This invention relates to wave energy apparatus, that is apparatus adapted to convert the energy of waves produced on the surface of the sea or other bodies of water, into a useful form such as electrical energy, hydraulic energy and so forth.

Wave energy apparatus is known, in which the displacement of water causes air or another fluid to flow through a turbine which drives an electrical generator. Since the water displacement is oscillatory in nature, the turbine may advantageously be such that the flow of air in either direction will cause the turbine rotor to rotate in a single direction. The apparatus may be in the form of a floating buoy or the like.

U.S. Pat. No. 3,064,137 discloses a buoy having a vertically extending open ended passage. Water can enter the passage at the lower end, and oscillation of the water level inside the passage causes air to flow alternately in and out of the upper end of the passage. Adjacent the upper end of the passage is positioned a turbine with a rotor having two sets of blades which respectively operate in opposite directions of air flow, so that the rotor always rotates in the same direction.

In U.S. Pat. No. 4,221,538 there is disclosed an improved form of turbine incorporated in wave energy apparatus. The rotor has a plurality of blades each of which is of aerofoil cross-section and is fixed with its plane of zero lift normal to the axis of the rotor. This causes the rotor to rotate in a single direction, regardless of the direction of air flow. The apparatus is once again in the form of a buoy, having an open bottom so that an oscillating body of water within the buoy causes the air flow.

As is described in U.S. Pat. No. 3,064,137, the movement of a buoy can be resolved into two basic modes: vertical movement caused by the rise and fall, or heave, of the waves, and rocking movement. The vertical movement has been considered the most important source of energy in apparatus in this type, and the apparatus of U.S. Pat. Nos. 3,064,137 or 4,221,538 is capable only of absorbing energy in this mode, from the vertical oscillation of a body of water.

It has now been found that the absorption of roll or pitch energy could considerably increase the efficiency of wave energy apparatus of the type described above. Calculations have shown that a buoy for example—which can be considered as a quasi-spherical body—absorbs wave energy efficiently when undergoing orbital motion, that is a combination of vertical and horizontal movement. Horizontal movement is manifested as roll or pitch of the buoy.

In wave energy apparatus as described previously, the water contained by the buoy can be considered as a driving liquid, for pumping air, which can be considered as a working fluid, through the turbine in either direction. Pumping is achieved only by vertical oscillation of the body of driving liquid.

As a result of roll or pitch of the buoy, there will be a differential displacement of driving liquid in different parts of the buoy. An object of the invention therefore is to enable the absorption of energy from pitch or roll by utilising such differential displacement as an additional pumping source.

According to the invention there is provided wave energy apparatus comprising a body adapted to float in water, said body being provided with a turbine having a rotor such that a flow of working fluid through the turbine in either axial direction causes the rotor to rotate always in the same direction, and a plurality of conduits for directing working fluid to respective regions of said turbine for axial flow therethrough, each of said conduits being connected to a source of driving liquid at different respective locations in said body, the arrangements being such that the driving liquid urges working fluid along the conduits in response to both vertical and rocking movements of the body.

Considering vertical movement only, the conduits will generally supply working fluid to the turbine in phase as regards flow direction. In response to rocking movement, the flow direction for any given conduit will depend on the position of the driving fluid to which it is connected, relative to the rocking axis. Since the rotor rotates in the same direction regardless of the flow direction of the working fluid, rocking movement will result in the rotor being driven.

To modify the apparatus of for example U.S. Pat. No. 4,221,538 at least one partition may be provided inside the buoy, extending from the region of the turbine into the water. Without such a partition, whilst rocking motion would produce, in the water inside the buoy, an increase in level on one side of the rocking axis and a corresponding decrease in level on the other side of the rocking axis, there would be no net flow of air through any part of the turbine. By providing the partition, there will be a flow of air up through one region of the turbine, and down through another region of the turbine. As a rotor blade passes from one region to the other, it will encounter a change in the direction of air flow but will continue to drive the rotor in the same direction.

Two conduits, provided for example by a single partition extending diametrically across the column of water contained in the buoy, would permit the absorption of rocking energy only about a single axis extending across the buoy in the plane of the partition. This might be of use if the wave direction is constant and the buoy is moored so as to be suitably aligned. Preferably however, at least three conduits are provided equi-angularly spaced. These could be formed by three radially extending partitions within the buoy. Four, six, eight or more conduits could be employed if required.

The rocking movements of the body are produced by horizontal components of wave movement. For these to be effectively converted into pitch or roll of the body, the rigid contents of the body should have a low centre of mass. A body suitably constructed, and with at least three conduits, should be able to absorb energy in five modes, namely heave, pitch, surge, sway and roll.

Preferably, in use the body should be substantially immersed if the best use is to be made of horizontal components of oscillation; the wetted surface should be maximised in order to receive the maximum horizontal forces, but the velocity ratio will be increased for unnecessarily deep immersion. The body should preferably be rotationally symmetric about the vertical axis.

In the wave energy apparatus of U.S. Pat. No. 4,221,538 the floating body is ballasted by means of a submerged, water-filled sphere. It has now been found that this sphere could be a source of energy losses, since it acts as an uncontrolled radiator. Preferably therefore the ballast is in the form of a dense solid mass at the base of the body. The resultant low centre of mass improves the absorption of horizontal components of wave movement, and means that the centre of roll will be near the base of the body, so that large cyclic mooring forces can be obviated. The mooring points are preferably situated near the base of the body.

In the wave energy apparatus disclosed in U.S. Pat. Nos. 3,164,137 or 4,221,538, the buoy has an open bottom, and the oscillating column of water is provided by a portion of the sea surrounded by the buoy. The necessary oscillatory pumping action can however be provided by a body of driving liquid contained within a closed-bottom buoy, providing that the driving liquid is acted upon by a resilient medium so that the necessary oscillation is obtained in response to vertical wave movements. The resilient medium could be in the form of an air spring, which may be defined by an air trap in the form of a hollow body with an open bottom and closed top.

Since the liquid at the centre of the floating body cannot provide much response to roll, the air spring could be provided in this region. Advantageously a single body of driving liquid, such as water, is used inside the body, and a single air spring arrangement. If desired, however, separate supplies of liquid with independent air springs, could be used for separate conduits directing air to the turbine. Heavy ballast such as concrete for example, may be required to compensate for the buoyancy of the entrapped air.

The buoy could be filled with sea water to the appropriate level, or be filled with any other suitable liquid such as fresh water or waste.

In the above described arrangement the buoy could be enclosed at the top, although the volume of air space above the liquid in the conduits would require to be much greater than the air entrapped, perhaps being ten times as great. Such a system of total enclosure would protect the turbine and the interior of the buoy. The buoy could be easily constructed to be strong and would be unsinkable.

Two embodiments of the invention will now be described by way of example and with reference to the accompanying drawings, in which:

FIG. 1 is a vertical section through a first embodiment of apparatus in accordance with the invention;

FIG. 2 is a horizontal section on the line II—II of FIG. 1;

FIG. 3 is a horizontal section of the line III—III of FIG. 1;

FIG. 4 is a horizontal section on the line IV—IV of FIG. 1;

Figure 5:
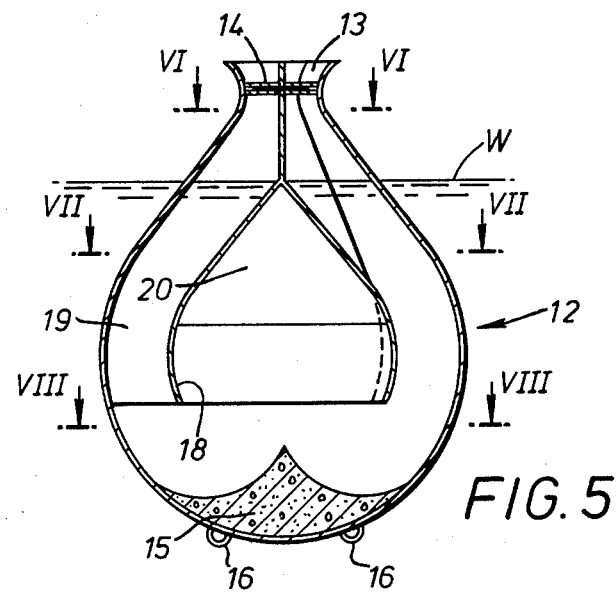
FIG. 5 is a vertical section through a second embodiment of apparatus in accordance with the invention.

Referring now to the drawings, in FIG. 1 there is shown wave energy apparatus in accordance with the invention, this particular embodiment being a modification of the type of apparatus disclosed in U.S. Pat. No. 4,221,538.

The apparatus comprises a buoy 1 including an open bottomed canopy 2. Around the periphery of the canopy 2 is an annular buoyancy chamber 3. The top of the canopy 2 is provided with an opening in the form of a convergent-divergent nozzle 4. In the nozzle 4 is mounted a turbine 5 connected to a generator (not shown). The turbine is of the type with a rotor which always rotates in the same direction, regardless of the direction of flow. The turbine is preferably of the type disclosed in U.S. Pat. No. 4,221,538. It could comprise a plurality of rotors on a common shaft. It could alternatively include an even number of coaxially disposed rotors on separate shafts which alternatively rotate in opposite directions.

The interior of the canopy is divided into three sections by radially extending partitions 6, equi-angularly spaced. The partitions extend from the wall of the canopy to a central supporting column 7. At the bottom of the column 7 is provided an inertial body in the form of a vessel 8 having a toroidal form at its lower end. This vessel can be flooded with water, to provide a low centre of mass for the buoy, so that it can pitch and roll freely.

The partitions 6 extend from above the turbine 5, to below the water level W, and are attached at their lower ends to vessel 8. This provides a strong structure.

The partitions 6 divide the interior of the buoy into three separate conduits 9 for directing air to the turbine 5. Each conduit 9 is open at the bottom through an opening 10 defined between the canopy 2 and the upper, upwardly inclined conical surface 11 of vessel 8. In response to the heave motion, the water in the three conduits will oscillate, vertically, rising and falling simultaneously in the three conduits. Pitching or rolling will cause the water to rise in one or more of the conduits, and to fall in the remainder. Thus air will be forced upwards through the one or more conduits, and drawn into the remainder. The resultant air flows, although in different directions, will cause the rotor of the turbine 5 to rotate. Thus, both heave and pitch or roll energy can be harnessed.

As can be seen, the openings 10 of vertical conduits 9 are laterally disposed. It has been found that the ability of the device to accept energy from a wide range of waves can be improved by careful design of the geometry of the conduit entrance. A lateral facing conduit entrance provides an advantage in that the interior conduit wall serves to translate wave particle motions in the horizontal plane to motion in the vertical plane by reflection against e.g. the inclined conical surface 11. The horizontal components can thus be better utilised. It has been proposed that a more upwardly facing conduit, e.g. of J-shaped longitudinal section, would be useful.

Figures 6, 7:
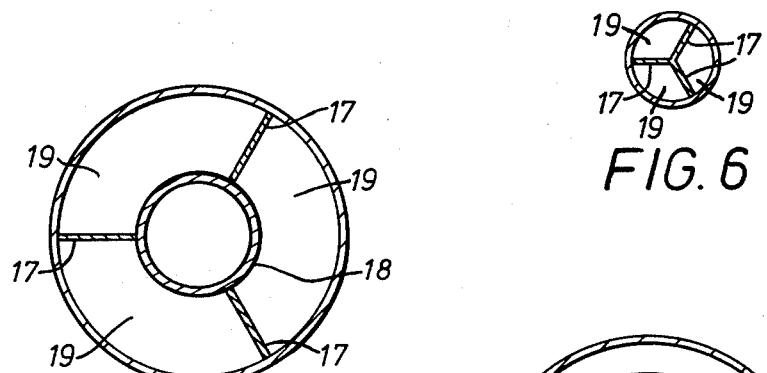
FIG. 6 is a horizontal section on the line VI—VI of FIG. 5.
FIG. 7 is a horizontal section on the line VII—VII of FIG. 5.
Figure 8:
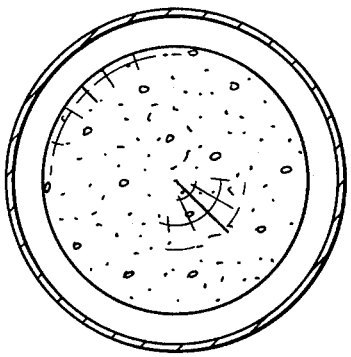
FIG. 8 is a horizontal section on the line VIII—VIII of FIG. 5.

The apparatus shown in FIGS. 5 to 8 comprises a buoy 12 in the form of a quasi-spherical, open topped flask. The opening is in the form of a convergent-divergent nozzle 13. In the nozzle 13 is a turbine 14 of the type described in relation to the previous embodiment. The buoy is provided at its base with heavy ballast 15, for example of concrete. Mooring points 16 are provided at the base of the buoy. In this matter, horizontal movements are converted into pitch or roll about a centre near the base, this reducing cyclic mooring forces.

Within the buoy are provided three radial partitions 17 and an annular conical partition 18. These define three conduits for directing air through the turbine 14, the radial partitions extending up into the nozzle 13 of the buoy. The annular partition defines a conical open-bottomed chamber. When the buoy is filled with seawater—or another liquid—up to the level W, air is trapped in space 19 bounded by the partition 18.

When the buoy undergoes heave motion, the liquid within oscillates against the resilient action of the entrapped air, so that air passes through the turbine. Pitching or rolling will cause liquid to rise and fall in different conduits defined by the partitions, in a manner analogous to that of the previous embodiments.

The embodiments of wave energy apparatus described herein can be of relatively large size, for example their diameter being 80% of the wavelength to be experienced—such wavelengths being for example of the order of 100 m. Large size buoys would be particularly useful for general energy generation; smaller buoys can be used for special purposes.

I claim:

1. Wave energy apparatus comprising a body adapted to float in water, said body being provided with a turbine such that a flow of working fluid through the turbine in either axial direction causes the rotor to rotate always in the same direction, and a plurality of conduits for directing working fluid to respective regions of said turbine for axial flow therethrough, each of said conduits being connected to a source of driving liquid at different respective locations in said body, the arrangement being such that the driving liquid urges working fluid along the conduits in response to both vertical and rocking movements of the body.

2. Apparatus as claimed in claim 1, wherein the conduits are vertically disposed.

3. Apparatus as claimed in claim 2, wherein the conduits are defined by at least one vertically extending partition inside a hollow buoy.

4. Apparatus as claimed in claim 3, wherein the body has openings for communicating the lower ends of the conduits with water in which the body is to float, such water constituting the said driving liquid.

5. Apparatus as claimed in claim 4, wherein the openings are laterally disposed.

6. Apparatus as claimed in claim 5, wherein the bottom of each conduit is defined by a portion inclined upwardly with respect to the base of the respective opening.

7. Apparatus as claimed in claim 4, 5 or 6, comprising a canopy having an open top and an open bottom, and an inertial body beneath the canopy and connected thereof.

8. Apparatus as claimed in claim 3, wherein the body has a closed bottom and is adapted to contain a body of said driving liquid, means being arranged to provide a resilient medium for acting against the driving liquid.

9. Apparatus as claimed in claims 2, 3, 4, 5, 6 or 8 wherein the body is rotationally symmetrical about its vertical axis and wherein at least three equiangularly arranged conduits are provided.

10. Apparatus as claimed in claims 1, 2, 3, 4, 5, 6 or 8 wherein the turbine comprises a rotor having a plurality of blades each of which is of aerofoil cross-section and is fixed with its plane of zero lift normal to the axis of the rotor.

11. Apparatus as claimed in claim 7 wherein the body is rotationally symmetrical about its vertical axis and wherein at least three equiangularly arranged conduits are provided.

12. Apparatus as claimed in claim 7 wherein the turbine comprises a rotor having a plurality of blades each of which is of aerofoil cross-section and is fixed with its plane of zero lift normal to the axis of the rotor.

13. Apparatus as claimed in claim 9 wherein the turbine comprises a rotor having a plurality of blades each of which is of aerofoil cross-section and is fixed with its plane of zero lift normal to the axis of the rotor.

* * * * *